US010283073B2

(12) United States Patent
Edsö et al.

(10) Patent No.: US 10,283,073 B2
(45) Date of Patent: May 7, 2019

(54) DATA PROCESSING SYSTEMS

(71) Applicant: ARM Limited, Cambridge (GB)

(72) Inventors: Tomas Edsö, Lund (SE); Ola Hugosson, Lund (SE); Dominic Symes, Cambridge (GB)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 14/873,030

(22) Filed: Oct. 1, 2015

(65) Prior Publication Data

US 2016/0098814 A1 Apr. 7, 2016

(51) Int. Cl.

| | |
|---|---|
| ***G06T 1/60*** | (2006.01) |
| ***G09G 5/00*** | (2006.01) |
| ***G09G 5/393*** | (2006.01) |

(52) U.S. Cl.

CPC ............ *G09G 5/001* (2013.01); *G09G 5/393* (2013.01); *G09G 2320/103* (2013.01); *G09G 2340/02* (2013.01); *G09G 2340/0428* (2013.01); *G09G 2350/00* (2013.01); *G09G 2360/12* (2013.01); *G09G 2360/121* (2013.01); *G09G 2360/18* (2013.01)

(58) Field of Classification Search

None

See application file for complete search history.

(56) References Cited

U.S. PATENT DOCUMENTS 5,861,922 A 1/1999 Murashita et al.
6,304,297 B1 * 10/2001 Swan .................... G06F 3/1415 345/501
6,434,196 B1 * 8/2002 Sethuraman ......... H04N 19/176 348/415.1
7,672,005 B1 * 3/2010 Hobbs ...................... H04N 1/41 345/543

(Continued)

FOREIGN PATENT DOCUMENTS

GB 2474114 4/2011

OTHER PUBLICATIONS

Lin, Wei-Cheng, and Chung-Ho Chen. "Exploring reusable frame buffer data for MPEG-4 video decoding." Circuits and Systems, 2006. ISCAS 2006. Proceedings. 2006 IEEE International Symposium on. IEEE, 2006.*

(Continued)

*Primary Examiner* — Yu Chen

(74) *Attorney, Agent, or Firm* — Vierra Magen Marcus LLP

(57) ABSTRACT

A video processing system comprises a video processor and an output buffer. When a new frame is to be written to the output buffer, the video processing system determines (12) for at least a portion of the new frame whether the portion of the new frame has a particular property. When it is determined that that the portion of the new frame has the particular property (14), when a block of data representing a particular region of the portion of the new frame is to be written to the output buffer, it is compared to at least one (Continued)

block of data already stored in the output buffer, and a determination is made whether or not to write the block of data to the output buffer on the basis of the comparison. When it is determined that the portion of the new frame does not have the particular property (16), the portion of the new frame is written to the output buffer.

12 Claims, 5 Drawing Sheets

(56) References Cited

U.S. PATENT DOCUMENTS

| | | | | |
|---|---|---|---|---|
| 7,747,086 | B1 | 6/2010 | Hobbs et al. | |
| 8,855,414 | B1 | 10/2014 | Hobbs et al. | |
| 2005/0066083 | A1 | 3/2005 | Chan et al. | |
| 2007/0132771 | A1 | 6/2007 | Peer | |
| 2010/0061448 | A1 | 3/2010 | Zhou et al. | |
| 2010/0195733 | A1 | 8/2010 | Yan et al. | |
| 2011/0074800 | A1* | 3/2011 | Stevens | G06T 11/40 345/545 |
| 2011/0080419 | A1* | 4/2011 | Croxford | G09G 5/393 345/531 |
| 2013/0128948 | A1 | 5/2013 | Rabii et al. | |
| 2013/0259132 | A1 | 10/2013 | Zhou et al. | |
| 2013/0272394 | A1* | 10/2013 | Brockmann | G06T 9/00 375/240.12 |
| 2014/0099039 | A1 | 4/2014 | Kouno et al. | |

OTHER PUBLICATIONS

Lin, Wei-Cheng, and Chung-Ho Chen. "Frame buffer access reduction for MPEG video decoder." IEEE Transactions on Circuits and Systems for Video Technology 18.10 (2008): 1452-1456.*

GB Search Report dated Apr. 7, 2015, GB Patent Application No. GB1417706.7.

Hugosson, U.S. Appl. No. 14/873,037, filed Oct. 1, 2015, titled Data Processing Systems.

Amendment dated Oct. 6, 2017, in U.S. Appl. No. 14/873,037, filed Oct. 1, 2015.

Office Action dated Nov. 3, 2017, in U.S. Appl. No. 14/873,037, filed Oct. 1, 2015.

Amendment dated Feb. 5, 2018, in U.S. Appl. No. 14/873,037, filed Oct. 1, 2015.

Office Action dated Apr. 25, 2018, in U.S. Appl. No. 14/873,037, filed Oct. 1, 2015.

Amendment dated Sep. 20, 2018, in U.S. Appl. No. 14/873,037, filed Oct. 1, 2015.

Notice of Allowance dated Nov. 8, 2018, in U.S. Appl. No. 14/873,037, filed Oct. 1, 2015.

Office Action dated Jun. 6, 2017, in U.S. Appl. No. 14/873,037, filed Oct. 1, 2015.

Zhao et al., "Macroblock Skip-Mode Prediction for Complexity Control of Video Encoders", The Institution of Electrical Engineers, Jul. 2003, pp. 5-8.

* cited by examiner

DATA PROCESSING SYSTEMS

BACKGROUND

The technology described herein relates to the display of video data, and methods of encoding and decoding video data.

As is known in the art, the output (e.g. frame) of a video processing system is usually written to an output buffer (e.g. frame or window buffer) in memory when it is ready for display. The output buffer may then be read by a display controller and output to the display (which may, e.g., be a screen) for display, or may be read by a composition engine and composited to generate a composite frame for display.

The writing of the data to the output buffer consumes a relatively significant amount of power and memory bandwidth, particularly where, as is typically the case, the output buffer resides in memory that is external to the video processor.

It is known therefore to be desirable to try to reduce the power consumption of output buffer operations, and various techniques have been proposed to try to achieve this.

One such technique is disclosed in the Applicants' earlier application GB-2474114. According to this technique, each output frame is written to the output buffer by writing blocks of data representing particular regions of the frame. When a block of data is to be written to the output buffer, the block of data is compared to a block of data already stored in the output buffer, and a determination is made as to whether or not to write the block of data to the output buffer on the basis of the comparison.

The comparison is made between a signature representative of the content of the new data block and a signature representative of the content of the data block stored in the output buffer. The signatures may comprise, for example, CRCs which are calculated and stored for each block of data. If the signatures are the same (thus indicating that the new data block and the stored data block are the same (or sufficiently similar), the new data block is not written to the output buffer, but if the signatures differ, the new data block is written to the output buffer.

Although the method of GB-2474114 is successful in reducing the power consumed and bandwidth used for the output buffer operation, i.e. by eliminating unnecessary output buffer write transactions, the Applicants believe that there remains scope for improvements to such "transaction elimination" methods, particularly in the context of video data.

BRIEF DESCRIPTION OF THE DRAWINGS

Various embodiments of the technology described herein will now be described by way of example only and with reference to the accompanying drawings, in which.

DETAILED DESCRIPTION

Figure 1:
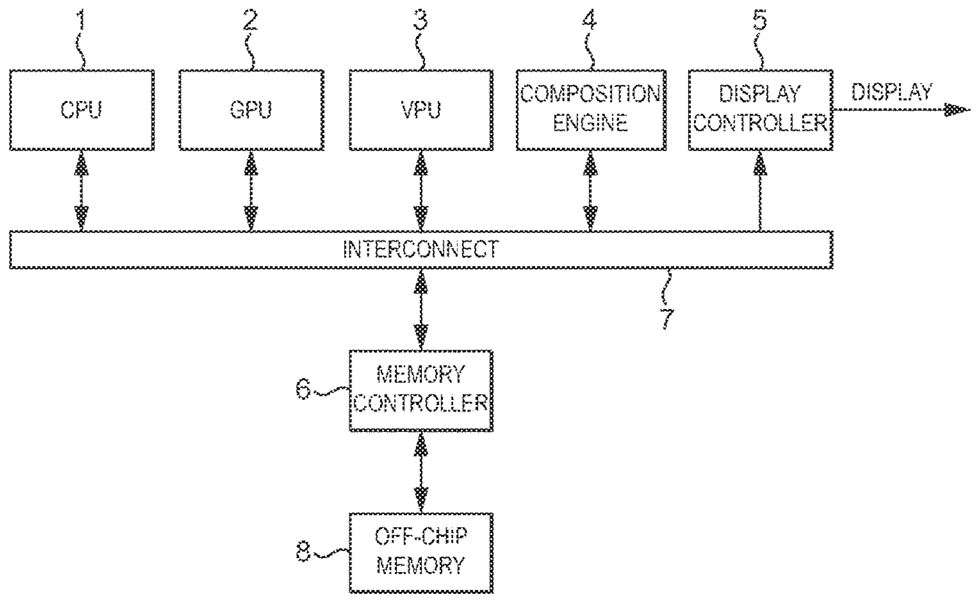
FIG. 1 shows schematically a media processing system which may be operated in accordance with the technology described herein.

A first embodiment of the technology described herein comprises a method of operating a video processor comprising:

when a new frame is to be stored in an output buffer, determining for at least a portion of the new frame whether the portion of the new frame has a particular property;

wherein if it is determined that that the portion of the new frame has the particular property, then the method further comprises: when a block of data representing a particular region of the portion of the new frame is to be written to the output buffer, comparing that block of data to at least one block of data already stored in the output buffer, and determining whether or not to write the block of data to the output buffer on the basis of the comparison;

wherein if it is determined that the portion of the new frame does not have the particular property, then the method further comprises: writing the portion of the new frame to the output buffer.

A second embodiment of the technology described herein comprises a video processing system comprising:

a video processor; and an output buffer;

wherein the video processing system is configured:

(i) when a new frame is to be stored in the output buffer, to determine for at least a portion of the new frame whether the portion of the new frame has a particular property;

(ii) if it is determined that that the portion of the new frame has the particular property: when a block of data representing a particular region of the portion of the new frame is to be written to the output buffer, to compare that block of data to at least one block of data already stored in the output buffer, and to determine whether or not to write the block of data to the output buffer on the basis of the comparison; and (iii) if it is determined that the portion of the new frame does not have the particular property: to write the portion of the new frame to the output buffer.

The technology described herein relates to the display of video data. In the technology described herein, when a new frame is to be stored in the output buffer, it is determined for at least a portion of the new frame whether the portion of the new frame has a particular property (as will be discussed in more detail below).

If the portion of the new frame is determined to have the particular property, then the portion of the frame is subjected to a "transaction elimination" operation, i.e. a block of data representing a particular region of the portion of the new frame is compared with a block of data already stored in the output buffer, and a determination is made as to whether or not to write the block of data to the output buffer on the basis of the comparison.

If the portion of the new frame is determined not to have the particular property, then the portion of the frame is written to the output buffer, and the portion of the frame is in an embodiment not subjected to a transaction elimination operation or at least some part of the processing required for a transaction elimination operation is omitted.

Thus, the technology described herein effectively allows dynamic control of the transaction elimination operation, depending on the particular property of at least a portion of the frame.

The Applicants have recognised that this arrangement is particularly suited to and useful for the display of video data. This is because video data or certain portions of video data can be both relatively static from frame to frame (e.g. if the camera position is static), and variable from frame to frame (e.g. if the camera position is moving). The transaction elimination operation will be relatively successful for the static periods, but will only have limited success for the variable periods. Accordingly, it will often be the case that most of or all of (one or more potions of) a frame will end up being written to the output buffer (i.e. even after being subjected to transaction elimination) when the image is relatively variable. In such cases, the extra processing and bandwidth required to perform the transaction elimination operation is effectively wasted.

Moreover (and as will be discussed further below), the Applicants have recognised that, in the case of video data, it is possible to determine from at least certain properties of (one or more portions of) the video frame itself, the likelihood that the transaction elimination operation will be successful or sufficiently successful, e.g. so as to justify the extra cost of performing transaction elimination for (the one or more portions of) the frame.

Thus, the technology described herein, by determining whether at least a portion of a new video frame has a particular property, can (and in an embodiment does) dynamically enable and disable transaction elimination or at least a part of the processing required for transaction elimination, e.g. on a frame-by-frame basis, so as to avoid or reduce the additional processing and bandwidth requirements for the transaction elimination operation where it is deemed to be unnecessary (i.e. when at least a portion of a new frame is determined to have the particular property). Accordingly, the total power and bandwidth requirements of the system when outputting video data can be further reduced.

In an embodiment, the video processing system is configured to store a frame or frames output from the video processor in the output buffer by writing blocks of data representing particular regions of the frame to the output buffer. Correspondingly, the new frame is in an embodiment a new frame output by the video processor.

The output buffer that the data is to be written to may comprise any suitable such buffer and may be configured in any suitable and desired manner in memory. For example, it may be an on chip buffer or it may be an external buffer. Similarly, it may be dedicated memory for this purpose or it may be part of a memory that is used for other data as well.

In one embodiment the output buffer is a frame buffer for the video processing system and/or for the display that the video processing system's output is to be provided to. In another embodiment, the output buffer is a window buffer, e.g. in which the video data is stored before it is combined into a composited frame by a window compositing system. In another embodiment, the output buffer is a reference frame buffer, e.g. in which a reference frame output by a video encoder or decoder is stored.

The blocks of data that are considered and compared in the technology described herein can each represent any suitable and desired region (area) of the output frame that is to be stored in the output buffer.

Each block of data in an embodiment represents a different part (sub region) of the overall output frame (although the blocks could overlap if desired). Each block should represent an appropriate region (area) of the output frame, such as a plurality of pixels within the frame. Suitable data block sizes would be, e.g., 8×8, 16×16 or 32×32 pixels in the output frame.

In one embodiment, the output frame is divided into regularly sized and shaped regions (blocks of data), in an embodiment in the form of squares or rectangles. However, this is not essential and other arrangements could be used if desired.

In one embodiment, each data block corresponds to a pixel block that the video processing system (e.g. video processor or video codec) produces as its output. This is a particularly straightforward way of implementing the technology described herein, as the video processor will generate the pixel blocks directly, and so there will be no need for any further processing to "produce" the data blocks that will be considered in the manner of the technology described herein.

In an embodiment, the technology described herein may be, and in an embodiment is, also or instead performed using data blocks of a different size and/or shape to the pixel blocks that the video processor operates on (produces).

For example, in an embodiment, a or each data block that is considered in the technology described herein may be made up of a set of plural pixel blocks, and/or may comprise only a sub portion of a pixel block. In these cases there may be an intermediate stage that, in effect, "generates" the desired data block from the pixel block or blocks that the video processor generates.

In one embodiment, the same block (region) configuration (size and shape) is used across the entire output frame. However, in another embodiment, different block configurations (e.g. in terms of their size and/or shape) are used for different regions of a given output frame. Thus, in one embodiment, different data block sizes may be used for different regions of the same output frame.

In an embodiment, the block configuration (e.g. in terms of the size and/or shape of the blocks being considered) can be varied in use, e.g. on an output frame by output frame basis. In an embodiment the block configuration can be adaptively changed in use, for example, and in an embodiment, depending upon the number or rate of output buffer transactions that are being eliminated (avoided) (for those frames for which transaction elimination is enabled). For example, and in an embodiment, if it is found that using a particular block size only results in a low probability of a block not needing to be written to the output buffer, the block size being considered could be changed for subsequent output frames (for those frames for which transaction elimination is enabled) (e.g., and in an embodiment, made smaller) to try to increase the probability of avoiding the need to write blocks of data to the output buffer.

Where the data block size is varied in use, then that may be done, for example, over the entire output frame, or over only particular regions of the output frame, as desired.

The determination as to whether the new frame has a particular property should be carried out for at least a portion of the new frame.

In one embodiment, the determination is made for all of the frame. In this case, the portion of the frame will comprise the entire frame. Thus, in this embodiment, the method comprises: when a new frame is to be stored in the output buffer, determining whether the new frame has a particular property; wherein if it is determined that that the new frame has the particular property, then the method in an embodiment further comprises: when a block of data representing a particular region of the new frame is to be written to the output buffer, comparing that block of data to at least one block of data already stored in the output buffer, and determining whether or not to write the block of data to the output buffer on the basis of the comparison; wherein if it is determined that the new frame does not have the particular property, then the method in an embodiment further comprises: writing the new frame to the output buffer.

In other embodiments, the determination is made for a portion or portions of the frame that each correspond to a part (to some), but not all of the frame. In these embodiments, the determination may be made for a single portion of the new frame, or may be made for plural, e.g. separate, portions of the frame. In an embodiment, the frame is divided into plural portions, and the determination (and subsequent processing) is done separately for plural, and in an embodiment for each, of the plural portions that the frame is divided into.

The portion or portions for which the determination is made may take any desired shaped and/or size. In one embodiment, the portion or portions correspond to one or more of the regions (e.g. pixel blocks) into which the frame is divided (as discussed above).

The determination as to whether a portion of the new frame has the particular property may be carried out in any suitable and desired manner.

In one embodiment, it is done by evaluating information that is provided to the video processor in addition to (i.e. over and above) the data describing the new frame. Such information may be provided to the video processor, e.g. particularly for this purpose. In one embodiment, the information comprises information indicating for a set of blocks of data representing particular regions of the portion of the frame, which of those blocks have changed from the previous frame. In this embodiment, this information is provided to the video processor, and then the video processor in an embodiment uses the provided block information to determine whether the portion of the new frame has the particular property.

However, in an embodiment, the determination as to whether a portion of the new frame has the particular property is made based on (the data describing) the frame itself.

In one such embodiment, the determination is made by evaluating the portion of the frame when it is ready to be output, e.g. once it has been subjected to any of the necessary decoding and other operations, etc. However, in an embodiment, the determination is made before this stage, for example and in an embodiment by evaluating the encoded form of the portion of the frame (which will typically be the form in which the portion of the frame is received by the video processor or codec).

Accordingly, the method of the technology described herein in an embodiment further comprises a step of: when the new frame is to be stored in the output buffer, the video processor decoding the new frame. This step may be carried out before, after and/or during the determination step. The video processing system is in an embodiment correspondingly configured to do this.

The determination is in an embodiment made for each and every frame which is output from the video processor, e.g. on a frame-by-frame basis, although this is not necessary. It could also or instead, for example, be done at regular intervals (e.g. every two or three frames, etc.).

In one such embodiment, the results of the determination for one frame may be "carried over" to one or more following frames, e.g. such that if it is determined that that at least a portion of a first frame has the particular property, then the method may further comprise: when a block of data representing a particular region of a corresponding portion of one or more second subsequent frames is to be written to the output buffer, comparing that block of data to at least one block of data already stored in the output buffer, and determining whether or not to write the block of data to the output buffer on the basis of the comparison; and if it is determined that the portion of the first frame does not have the particular property, then the method may further comprise: writing a corresponding portion of one or more second subsequent frames to the output buffer, i.e. in an embodiment without subjecting the corresponding portions of the one or more second subsequent frames to a transaction elimination operation.

The particular property may be any suitable and desired (selected) property of the portion of the new frame. The particular property should be (and in an embodiment is) related to, in an embodiment indicative of, the likelihood that the transaction elimination operation will be successful (or unsuccessful), or sufficiently successful, e.g. such that the extra cost of performing transaction elimination for the portion of the frame may be justified.

In an embodiment, the particular property is related to whether or not (and/or the extent to which) the portion of the frame has changed relative to a previous frame. In an embodiment, if the portion of the frame is determined to have not changed by more than a particular, in an embodiment selected amount, from a previous frame, the portion of the frame is determined to have the particular property (and vice-versa). Correspondingly, in an embodiment, the particular property is related to whether or not a block or blocks of data representing particular regions of the portion of the frame has or have changed relative to a previous frame.

The particular property may be a property of the portion of the frame as it will be displayed, i.e. it may be a property of the decoded frame. However, in an embodiment, the particular property is a property of the encoded version of the frame.

Where the particular property is a property of the encoded version of the frame, the frame may be (have been) encoded using any suitable encoding technique. One particularly suitable technique (for encoding digital video data) is differential encoding. Video encoding standards that employ differential encoding include MPEG, H.264, and the like.

As is known in the art, generally, in encoded video data, such as differential encoded video data, each video frame is divided into a plurality of blocks (e.g. 16×16 pixel blocks in the case of MPEG encoding) and each block of the frame is encoded individually. In differential encoding, each differentially encoded data block usually comprises a vector value (the so-called "motion vector") pointing to an area of a reference frame to be used to construct the appropriate area (block) of the (current) frame, and data describing the differences between the two areas (the "residual"). (This thereby allows the video data for the area of the (current) frame to be constructed from video data describing the area in the reference frame pointed to by the motion vector and the difference data describing the differences between that area and the area of the current video frame.)

This information is usually provided as one or more "syntax elements" in the encoded video data. A "syntax element" is a piece of information encoded in the encoded video data stream that describes a property or properties of one or more blocks. Common such "syntax elements" include the motion vector, a reference index, e.g. which indicates which frame should be used as the reference frame (i.e. which frame the motion vector refers to), data describing the residual (i.e. the difference between a predicted block and the actual block), etc.

The Applicants have recognised that such "syntax elements" that describe the encoded blocks making up each frame can be used to assess the likelihood that the transaction elimination operation will be successful (or unsuccessful) for a portion of the frame, or will be sufficiently successful, e.g. such that the extra cost of performing transaction elimination for the portion of the frame may be justified. In particular, the Applicants have recognised that such "syntax elements" can indicate whether or not a given block has changed from one frame to the next, and that this information can be used in the context of transaction elimination, to selectively enable and disable transaction elimination.

For example, in cases where the reference frame for a given frame is the previous frame, if a given data block is encoded with a motion vector of zero (i.e. (0, 0)), and a residual of zero, then that block of data will not have changed relative to the equivalent block of data in the previous frame. For many video standards, such a data block (i.e. that has a motion vector of (0, 0) and a residual of zero) will be encoded with a single syntax element, typically referred to as a "SKIP" syntax element. Other encoding standards have equivalent syntax elements. In some standards, the motion vector need not be equal to (0, 0) to indicate that a block of data has not changed relative to the equivalent block of data in the previous frame.

In these cases it can be predicted, from the syntax elements encoding the block, whether the transaction elimination operation is likely to be successful or unsuccessful for the data block.

Thus, in an embodiment, the particular property is a property of one or more of the encoded data blocks that make up the encoded version of the portion of the frame. In an embodiment, the particular property is related to the syntax elements (e.g. motion vector and/or residual) of the encoded data blocks making up the portion of the frame. The particular property may be related to any or all of the syntax elements that describe each encoded block of data.

In one embodiment, the particular property is related to syntax elements (i.e. information encoded in the encoded video data stream) that indicate that the block has not changed relative to the corresponding block in the previous frame (i.e. that indicate that the block is static), such as for example a "SKIP" syntax element or corresponding syntax elements.

However this need not be the case. For example, if a given data block is encoded with a non-zero motion vector, and zero residual, the transaction elimination operation may be successful where data blocks for the portion of the new frame are compared to data blocks stored in the output buffer other than the corresponding data block (as will be discussed further below).

In one embodiment, particularly where the transaction elimination operation does not require an exact match between the blocks being compared (as will be discussed further below), the transaction elimination operation may be successful for a data block having a non-zero, but suitably small, residual (for example and in an embodiment a residual below a threshold). Thus, in one embodiment, the portion of the new frame may be determined to have the particular property if, inter alia, the residual of one or more encoded data blocks making up the portion of the frame is below a threshold.

In other embodiments, the reference frame for a given frame may not be the previous frame. However, as will be appreciated by those skilled in the art, it will still be possible to determine, from syntax elements describing a given data block, whether that block has changed relative to the equivalent (or another) data block in the previous frame.

For example, the reference frame may be an earlier frame than the previous frame, and the syntax elements encoding a particular block may indicate that the block is identical to (or sufficiently similar to) a block in the reference frame. In this case, if it can be determined that the intermediate block or blocks are also identical to (or sufficiently similar to) the reference frame block, then again, it can be determined that the transaction elimination operation will be successful.

Thus, in one embodiment, the determination involves both determining whether the portion of the new frame has the particular property, and determining whether (one or more, in an embodiment corresponding, portions of) a previous frame (or frames) has or had a particular property.

In one embodiment, the syntax elements that indicate that the block in question has not changed relative to the corresponding block in the previous frame comprises syntax elements that encode the block in question.

However, where filtering or deblocking is used, the content of neighbouring blocks can influence the content of the block in question. For example, if filtering is applied across block boundaries, a block whose syntax elements indicate that it is static (i.e. that it has not changed relative to the corresponding block in the previous frame) may be influenced by neighbouring, non-static blocks when the filtering is applied.

Thus, in another embodiment, the syntax elements (information) that are assessed to determine whether the block in question has not changed relative to the corresponding block in the previous frame may additionally or alternatively comprises syntax elements of one or more blocks other than the block in question, such as for example one or more neighbouring blocks to the block in question.

In other words, properties of a neighbouring block or blocks may also or instead be taken into account. This is in an embodiment done if a syntax element for the block in question indicates that the block is to be influenced by a neighbouring block or blocks, e.g. the block has a deblocking or filtering syntax element associated with it.

Thus, in embodiments, the syntax elements (information) that are assessed to determine whether the block in question has not changed relative to the corresponding block in the previous frame may additionally or instead comprise syntax elements (information) that indicate whether or not the content of the block is to be altered in some way, e.g. by filtering or deblocking.

In one embodiment, a portion of the frame is determined to have the particular property if a characteristic of the portion of the frame meets a particular, in an embodiment selected, in an embodiment predetermined, condition.

In one embodiment, the condition may relate to a threshold, which may, for example, be based on the number of blocks of data that make up the portion of the frame that have a particular characteristic. In one embodiment, a portion of the frame is determined to have the particular property if at least one of the blocks of data that make up the portion of the (encoded or decoded version of the) frame has a particularly characteristic (e.g. has not changed relative to the previous frame). However, in an embodiment, a portion of the frame is determined to have the particular property if a sufficient number of the blocks of data that make up the portion of the frame have a particular characteristic (e.g.

have not changed relative to the previous frame), i.e. if the number of blocks that have the characteristic is greater than or equal to (or less than (or equal to)) a threshold.

Thus, for example, in an embodiment, a portion of the frame is determined to have the particular property if a sufficient number of blocks making up the portion of the frame have not changed relative to the previous frame, i.e. in an embodiment with respect to a threshold.

In one embodiment, the threshold is set such that a portion of a frame is determined to have the particular property if the processing and/or bandwidth cost that will be saved by implementing transaction elimination in the output buffer operation is likely to be greater than the processing and/or bandwidth cost required to perform the transaction elimination operation. Conversely and in an embodiment, a portion of a frame is determined not to have the particular property if the processing and/or bandwidth cost that will be saved by implementing transaction elimination in the output buffer operation is likely to be less than the processing and/or bandwidth cost required to perform the transaction elimination operation.

As discussed above, if it is determined that the portion of the new frame has the particular property, then the portion of the frame is in an embodiment subjected to a transaction elimination operation.

In this case, rather than each output data block of the portion of the frame simply being written out to the output buffer once it is ready, the output data block is instead first compared to a data block or blocks (to at least one data block) that is already stored in the output (e.g. frame or window) buffer, and it is then determined whether to write the (new) data block to the output buffer (or not) on the basis of that comparison.

As discussed in GB-2474114, this process can be used to reduce significantly the number of data blocks that will be written to the output buffer in use, thereby significantly reducing the number of output buffer transactions and hence the power and memory bandwidth consumption related to output buffer operation.

For example, if it is found that a newly generated data block is the same as a data block that is already present in the output buffer, it can be (and in an embodiment is) determined to be unnecessary to write the newly generated data block to the output buffer, thereby eliminating the need for that output buffer "transaction".

As discussed above, for certain types or periods of video data, it may be a relatively common occurrence for a new data block to be the same or similar to a data block that is already in the output buffer, for example in regions of video that do not change from frame to frame (such as the sky, the background when the camera position is static, or banding, etc.). Thus, by facilitating the ability to identify such regions (e.g. pixel blocks) and to then, if desired, avoid writing such regions (e.g. pixel blocks) to the output buffer again, a significant saving in write traffic (write transactions) to the output buffer can be achieved.

Thus the power consumed and memory bandwidth used for output buffer operation can be significantly reduced, in effect by facilitating the identification and elimination of unnecessary output buffer transactions.

The comparison of the newly generated output data block (e.g. pixel block) with a data block already stored in the output buffer can be carried out as desired and in any suitable manner. The comparison is in an embodiment so as to determine whether the new data block is the same as (or at least sufficiently similar to) the already stored data block or not. Thus, for example, some or all of the content of the new data block may be compared with some or all of the content of the already stored data block.

In an embodiment, the comparison is performed by comparing information representative of and/or derived from the content of the new output data block with information representative of and/or derived from the content of the stored data block, e.g., and in an embodiment, to assess the similarity or otherwise of the data blocks.

The information representative of the content of each data block (e.g. pixel block) may take any suitable form, but is in an embodiment based on or derived from the content on the data block. In an embodiment it is in the form of a "signature" for the data block which is generated from or based on the content of the data block. Such a data block content "signature" may comprise, e.g., and in an embodiment, any suitable set of derived information that can be considered to be representative of the content of the data block, such as a checksum, a CRC, or a hash value, etc., derived from (generated for) the data block. Suitable signatures would include standard CRCs, such as CRC32, or other forms of signature such as MD5, SHA 1, etc.

Thus, in an embodiment, for portions of frames determined to have the particular property, a signature indicative or representative of, and/or that is derived from, the content of the data block is generated for each data block that is to be compared, and the comparison process comprises comparing the signatures of the respective data blocks.

Thus, in an embodiment, if it is determined that a portion of the new frame has the particular property, a signature, such as a CRC value, is generated for each data block of the portion of the frame that is to be written to the output buffer (e.g. and in an embodiment, for each output pixel block that is generated). Any suitable "signature" generation process, such as a CRC function or a hash function, can be used to generate the signature for a data block. In an embodiment the data block (e.g. pixel block) data is processed in a selected, in an embodiment particular or predetermined, order when generating the data block's signature. This may further help to reduce power consumption. In one embodiment, the data is processed using Hilbert order (the Hilbert curve).

The signatures for the data blocks (e.g. pixel blocks) that are stored in the output buffer should be stored appropriately. In an embodiment they are stored with the output buffer. Then, when the signatures need to be compared, the stored signature for a data block can be retrieved appropriately. In an embodiment the signatures for one or more data blocks, and in an embodiment for a plurality of data blocks, can be and are cached locally to the comparison stage, e.g. on the video processor itself, for example in an on chip signature (e.g., CRC) buffer. This may avoid the need to fetch a data block's signature from an external buffer every time a comparison is to be made, and so help to reduce the memory bandwidth used for reading the signatures of data blocks.

Where representations of data block content, such as data block signatures, are cached locally, e.g., stored in an on chip buffer, then the data blocks are in an embodiment processed in a suitable order, such as a Hilbert order, so as to increase the likelihood of matches with the data block(s) whose signatures, etc., are cached locally (stored in the on chip buffer).

It would, e.g., be possible to generate a single signature for an, e.g., RGBA, data block (e.g. pixel block), or a separate signature (e.g. CRC) could be generated for each colour plane. Similarly, colour conversion could be performed and a separate signature generated for the Y, U, V planes if desired.

As will be appreciated by those skilled in the art, the longer the signature that is generated for a data block is (the more accurately the signature represents the data block), the less likely there will be a false "match" between signatures (and thus, e.g., the erroneous non writing of a new data block to the output buffer). Thus, in general, a longer or shorter signature (e.g. CRC) could be used, depending on the accuracy desired (and as a trade off relative to the memory and processing resources required for the signature generation and processing, for example).

In an embodiment, the signature is weighted towards a particular aspect of the data block's content as compared to other aspects of the data block's content (e.g., and in an embodiment, to a particular aspect or part of the data for the data block (the data representing the data block's content)). This may allow, e.g., a given overall length of signature to provide better overall results by weighting the signature to those parts of the data block content (data) that will have more effect on the overall output (e.g. as perceived by a viewer of the image).

In one such embodiment, a longer (more accurate) signature is generated for the MSB bits of a colour as compared to the LSB bits of the colour. (In general, the LSB bits of a colour are less important than the MSB bits, and so it may be acceptable to use a relatively inaccurate signature for the LSB bits, as errors in comparing the LSB bits for different output data blocks (e.g. pixel blocks) will have a less detrimental effect on the overall output.)

In an embodiment, the length of the signature that is used can be varied in use.

In an embodiment, the completed data block (e.g. pixel block) is not written to the output buffer if it is determined as a result of the comparison that the data block should be considered to be the same as a data block that is already stored in the output buffer. This thereby avoids writing to the output buffer a data block that is determined to be the same as a data block that is already stored in the output buffer.

Thus, in an embodiment, the technology described herein comprises, for portions of frames determined to have the particular property, comparing a signature representative of the content of a data block (e.g. a pixel block) with the signature of a data block (e.g. pixel block) stored in the output buffer, and if the signatures are the same, not writing the (new) data block (e.g. pixel block) to the output buffer (but if the signatures differ, writing the (new) data block (e.g. pixel block) to the output buffer).

Where the comparison process requires an exact match between data blocks being compared (e.g. between their signatures) for the block to be considered to match such that the new block is not written to the output buffer, then, if one ignores any effects due erroneously matching blocks, the technology described herein should provide an, in effect, lossless process. If the comparison process only requires a sufficiently similar (but not exact) match, then the process will be "lossy", in that a data block may be substituted by a data block that is not an exact match for it.

The current, completed data block (e.g. pixel block) (e.g., and in an embodiment, its signature) can be compared with one, or with more than one, data block that is already stored in the output buffer.

In an embodiment at least one of the stored data blocks (e.g. pixel blocks) the (new) data block is compared with (or the only stored data block that the (new) data block is compared with) comprises the data block in the output buffer occupying the same position (the same data block (e.g. pixel block) position) as the completed, new data block is to be written to. Thus, in an embodiment, the newly generated data block is compared with the equivalent data block (or blocks, if appropriate) already stored in the output buffer.

In one embodiment, the current (new) data block is compared with a single stored data block only.

In another embodiment, the current, completed data block (e.g. its signature) is compared to (to the signatures of) plural data blocks that are already stored in the output buffer. This may help to further reduce the number of data blocks that need to be written to the output buffer, as it will allow the writing of data blocks that are the same as data blocks in other positions in the output buffer to be eliminated.

In this case, where a data block matches to a data block in a different position in the output buffer, the system in an embodiment outputs and stores an indication of which already stored data block is to be used for the data block position in question. For example a list that indicates whether the data block is the same as another data block stored in the output buffer having a different data block position (coordinate) may be maintained. Then, when reading the data block for, e.g., display purposes, the corresponding list entry may be read, and if it is, e.g., "null", the "normal" data block is read, but if it contains the address of a different data block, that different data block is read.

Where a data block is compared to plural data blocks that are already stored in the output buffer, then while each data block could be compared to all the data blocks in the output buffer, in an embodiment each data block is only compared to some, but not all, of the data blocks in the output buffer, such as, and in an embodiment, to those data blocks in the same area of the output frame as the new data block (e.g. those data blocks covering and surrounding the intended position of the new data block). This will provide an increased likelihood of detecting data block matches, without the need to check all the data blocks in the output buffer.

In one embodiment, each and every data block that is generated for a portion of an output frame determined to have the particular property is compared with a stored data block or blocks. However, this is not essential, and so in another embodiment, the comparison is carried out in respect of some but not all of the data blocks of a portion of a given output frame (determined to have the particular property).

In an embodiment, the number of data blocks that are compared with a stored data block or blocks for respective output frames is varied, e.g., and in an embodiment, on an frame by frame, or over sequences frames, basis. In one embodiment, this is based on the expected or determined correlation (or not) between portions of successive output frames.

Thus the technology described herein in an embodiment comprises processing circuitry for or a step of, for a portion of a given output frame that is determined to have the particular property, selecting the number of the data blocks that are to be written to the output buffer that are to be compared with a stored data block or blocks.

In an embodiment, fewer data blocks are subjected to a comparison when there is (expected or determined to be) little correlation between portions of the different output frames (such that, e.g., signatures are generated on fewer data blocks in that case), whereas more (and in an embodiment all) of the data blocks in a portion of an output frame are subjected to the comparison stage (and have signatures generated for them) when there is (expected or determined to be) a lot of correlation between portions of the different output frames (such that a lot of newly generated data blocks will be duplicated in the output buffer). This helps to reduce the amount of comparisons and signature generation, etc., that will be performed for the portions of the frames having the particular property, where it might be expected that fewer data blocks write transactions will be eliminated (where there is little correlation between portions of the output frames), whilst still facilitating the use of the comparison process where that will be particularly beneficial (i.e. where there is a lot of correlation between portions of the output frames).

In these arrangements, the amount of correlation between portions of different (e.g. successive) output frames may be estimated for this purpose, for example based on the correlation between portions of earlier output frames. For example, the number of matching data blocks in portions of previous pairs or sequences of output frames (as determined, e.g., and in an embodiment, by comparing the data blocks), and in an embodiment in the immediately preceding pair of output frames, may be used as a measure of the expected correlation for a portion of the current output frame. Thus, the number of data blocks found to match in a portion of the previous output frame may be used to select how many data blocks in a portion of the current output frame should be compared.

In an embodiment however, the amount of correlation between the portions of different (e.g. successive) output frames may be determined for this purpose based on the particular property of the portion of the current (new) frame, e.g. based on the syntax elements that encode the blocks of data making up the portion of the output frame (as discussed above).

In an embodiment, the number of data blocks that are compared for portions of frames determined to have the particular property can be, and in an embodiment is, varied as between different regions of the portion of the output frame.

In one such embodiment, this is based on the location of previous data block matches within a portion of a frame, i.e. such that an estimate of those regions of a portion of a frame that are expected to have a high correlation (and vice-versa) is determined and then the number of data blocks in different regions of the portion of the frame to be compared is controlled and selected accordingly. For example, the location of previous data block matches may be used to determine whether and which regions of a portion of the output frame are likely to remain the same and the number of data blocks to be compared then increased in those regions.

In an embodiment, the number of data blocks that are compared for a portion of a frame determined to have the particular property is varied between different regions of the portion of the output frame based on the particular property of the regions of the portion of the output frame, in an embodiment based on the syntax elements that encode the blocks of data that represent the regions of the portion of the output frame (as discussed above).

In an embodiment, the system is configured to always write a newly generated data block to the output buffer periodically, e.g., once a second, in respect of each given data block (data block position). This will then ensure that a new data block is written into the output buffer at least periodically for every data block position, and thereby avoid, e.g., erroneously matched data blocks (e.g. because the data block signatures happen to match even though the data blocks' content actually varies) being retained in the output buffer for more than a given, e.g. desired or selected, period of time.

This may be done, e.g., by simply writing out an entire new frame periodically (e.g. once a second). However, in an embodiment, new data blocks are written out to the output buffer individually on a rolling basis, so that rather than writing out a complete new output frame in one go, a selected portion of the data blocks in the output frame are written out to the output buffer each time a new output frame is being generated, in a cyclic pattern so that over time all the data blocks are eventually written out as new. In one such arrangement, the system is configured such that a (different) selected 1/nth portion (e.g. twenty fifth) of the data blocks are written out completely each output frame, so that by the end of a sequence of n (e.g. 25) output frames, all the data blocks will have been written to the output buffer completely at least once.

This operation is in an embodiment achieved by disabling the data block comparisons for the relevant data blocks (i.e. for those data blocks that are to be written to the output buffer in full). (Data block signatures are in an embodiment still generated for the data blocks that are written to the output buffer in full, as that will then allow those blocks to be compared with future data blocks.)

Where the technology described herein is to be used with a double buffered output (e.g. frame) buffer, i.e. an output buffer which stores two output frames concurrently, e.g. one being displayed and one that has been displayed and is therefore being written to as the next output frame to display, then the comparison process for portions of frames determined to have the particular property in an embodiment compares the newly generated data block with the oldest output frame in the output buffer (i.e. will compare the newly generated data block with the output array that is not currently being displayed, but that is being written to as the next output array to be displayed).

In an embodiment, the technology described herein is used in conjunction with another frame (or other output) buffer power and bandwidth reduction scheme or schemes, such as, and in an embodiment, output (e.g. frame) buffer compression (which may be lossy or loss less, as desired).

In an arrangement of the latter case, if a newly generated data block is to be written to the output buffer, the data block would then be accordingly compressed before it is written to the output buffer.

For portions of frames determined to have the particular property, where a data block is to undergo some further processing, such as compression, before it is written to the output buffer, then it would be possible, e.g., to perform the additional processing, such as compression, on the data block anyway, and then to write the so processed data block to the output buffer or not on the basis of the comparison. However, in an embodiment, the comparison process is performed first, and the further processing, such as compression, of the data block only performed if it is determined that the data block is to be written to the output buffer. This will then allow the further processing of the data block to be avoided if it is determined that the block does not need to be written to the output buffer.

The pixel block comparison process (and signature generation, where used) may be implemented in an integral part of the video processor, or there may, e.g., be a separate "hardware element" that is intermediate the video processor and the output buffer.

In an embodiment, there is a "transaction elimination" hardware element that carries out the comparison process and controls the writing (or not) of the data blocks to the output buffer. This hardware element in an embodiment also does the signature generation (and caches signatures of stored data blocks) where that is done. Similarly, where the data blocks that the technology described herein operates on are not the same as the, e.g., pixel blocks that the video codec produces, this hardware element in an embodiment generates or assembles the data blocks from the pixel blocks that the video codec generates.

In one embodiment, this hardware element is separate to the video processor, and in another embodiment is integrated in (part of) the video processor. Thus, in one embodiment, the comparison processing circuitry, etc., is part of the video processor itself, but in another embodiment, the video processing system comprises a video processor, and a separate "transaction elimination" unit or element that comprises the comparison processing circuitry, etc.

In an embodiment, the data block signatures that are generated for use for portions of frames determined to have the particular property are "salted" (i.e. have another number (a salt value) added to the generated signature value) when they are created. The salt value may conveniently be, e.g., the output frame number since boot, or a random value. This will, as is known in the art, help to make any error caused by any inaccuracies in the comparison process non deterministic (i.e. avoid, for example, the error always occurring at the same point for repeated viewings of a given video sequence).

Typically the same salt value will be used for a frame. The salt value may be updated for each frame or periodically. For periodic salting it is beneficial to change the salt value at the same time as the signature comparison is invalidated (where that is done), to minimise bandwidth to write the signatures.

The above discusses the situation where a portion of the new frame does have the particular property, and the "transaction elimination" operation is enabled.

If it is determined that the portion of the new frame does not have the particular property, then the portion of the new frame, in an embodiment all of (the blocks of data of) the portion of the new frame is written to the output (e.g. frame or window) buffer.

As well as this, in an embodiment, if it is determined that the portion of the new frame does not have the particular property, then at least some of the processing for the transaction elimination operation is omitted (not performed) for the frame portion in question.

In one such embodiment, (at least) the calculation of the information representative of and/or derived from the content of data blocks, e.g. the signatures, is omitted (disabled) for the portion of the frame if it is determined not to have the particular property. In this case, the comparison process may also be omitted (disabled) (and in one embodiment, this is done), but the comparison process need not be omitted (disabled).

In this latter case, where the comparison process is still performed, for those blocks of data whose signature value is not calculated, the signature value (in the output buffer) may be left as undefined, or may be set to a pre-defined value. In this embodiment, it should be (and in an embodiment is) ensured that the un-defined or pre-defined signature values are such that they will not match if or when they are compared with one or more signatures of data blocks already stored in the output buffer, such that the data block in question will be certain to be written to the output buffer.

Additionally or alternatively, one or more flags may be used, e.g. in the signature (CRC) buffer entries, to indicate that the blocks of the portion of the new frame should always be determined not to match, so that they will be written to the output buffer.

As will be appreciated, in this embodiment, although the processing and bandwidth required for the comparison operation is not omitted (in cases where the portion of the frame is determined not to have the particular property), the processing and/or bandwidth required for the calculation, storage and communication of the content-indicating signatures is omitted, such that the overall processing and/or bandwidth requirement is reduced.

In another embodiment, if it is determined that the portion of the new frame does not have the particular property, then the portion of the new frame is not subjected to a transaction elimination operation at all. Thus, in this embodiment, the blocks of data making up the portion of the new frame are in an embodiment not compared to blocks of data already stored in the output buffer. That is, in an embodiment, if it is determined that the portion of the new frame does not have the particular property, then the method further comprises: writing the portion of the new frame to the output buffer without comparing that block of data to another block of data.

Similarly in this case, the information representative of and/or derived from the content of data blocks, e.g. the signatures, is in an embodiment not calculated for the blocks of the portion of the new frame.

As discussed above, this then means that unnecessary processing and bandwidth can be omitted, e.g. where it can be determined that the portion of the frame (or most of the portion of the frame) will still be written to the output buffer despite being subjected to a transaction elimination operation.

As will be appreciated by those skilled in the art, although the technology described herein has been described above with particular reference to the processing of a single frame, the technology described herein may be, and is in an embodiment, used, i.e. to selectively enable and disable the transaction elimination operation, for plural, in an embodiment successive frames. Thus it may, for example, be repeated for each frame (i.e. on a frame-by-frame basis) or for every few frames, e.g. for every second, third, etc. frame.

In some embodiments, the video processor and/or video processing system comprises, and/or is in communication with, one or more memories and/or memory devices that store the data described herein, and/or store software for performing the processes described herein. The video processor and/or video processing system may also be in communication with and/or comprise a host microprocessor, and/or with and/or comprise a display for displaying images based on the data generated by the video processor.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the video processor can otherwise include any one or more or all of the usual functional units, etc., that video processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically an arrangement of a media processing system that is in accordance with the present embodiment. The media processing system comprises a central processing unit (CPU) 1, graphics processing unit (GPU) 2, video processing unit or codec (VPU) 3, composition engine 4, display controller 5 and a memory controller 6. As shown in FIG. 1, these communicate via an interconnect 7 and have access to off-chip main memory 8.

The graphics processor or graphics processing unit (GPU) 1, as is known in the art, produces rendered tiles of an output frame intended for display on a display device, such as a screen. The output frames are typically stored, via the memory controller 6, in a frame or window buffer in the off-chip memory 8.

The video processor or video processing unit (VPU) 3, as is known in the art, produces pixel blocks of an output frame intended for display on a display device, such as a screen. The output frames are typically stored, via the memory controller 6, in a frame or window buffer in the off-chip memory 8.

The composition engine 4, as is known in the art, can generate composited output frames from one or more input frames (e.g. generated by the GPU 2 and/or VPU 3 and stored in one or more window buffers). The composited output frames are typically stored, via the memory controller 6, in a frame buffer in the off-chip memory 8.

The display controller 5 operates to read an output frame from the frame buffer in the off-chip memory 8 via the memory controller 6 and to send it to a display for display.

As is known in the art, in such an arrangement, the video processor 3 receives encoded blocks of video data, e.g. from memory or elsewhere, and decodes the data blocks to generate blocks of pixel data to be displayed. The encoded blocks of video data may be, e.g., differential encoded blocks of video data, i.e. encoded with a motion vector and a residual (although this is not necessary).

Figure 2:
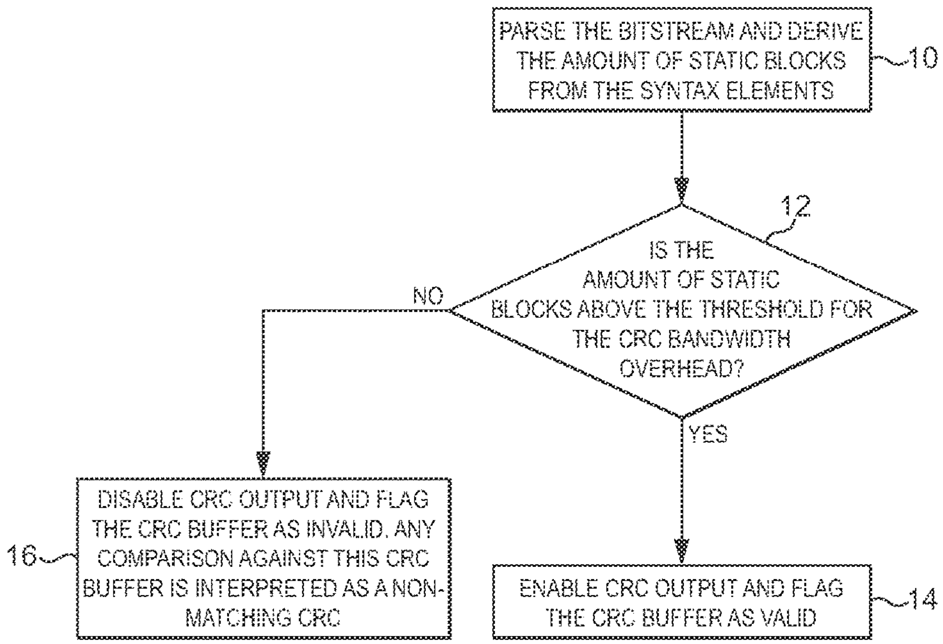
FIG. 2 shows schematically an embodiment of the technology described herein.

In the present embodiment, for each frame of encoded video data, the number of blocks of data within the frame that have not changed relative to the previous frame is counted. As is shown in FIG. 2, this is done by counting the number of "static" blocks in the frame (step 10), which is indicated by the syntax elements encoding the blocks, such as the "SKIP" syntax element in H.264, or similar such syntax elements in other encoding schemes.

It is then determined whether the number of static blocks exceeds a threshold (step 12). In the present embodiment, the threshold is set at the point at which the processing and/or bandwidth cost that will be saved by implementing transaction elimination in the output buffer operation should be greater than the processing and/or bandwidth cost required to perform the transaction elimination operation.

If the number of static blocks exceeds the threshold, then the frame is subjected to (full) transaction elimination (step 14). Thus, the CRC calculation and/or output is enabled and the CRC buffer is flagged as being valid. This will then mean that each block of the frame will be subjected to a comparison in the transaction elimination operation, as will be discussed further below.

If, however, the number of static blocks is below a threshold, then it is deemed to be unnecessary to perform (full) transaction elimination (step 16). In the present embodiment, the CRC output is disabled, and the CRC buffer for the blocks of data is flagged as invalid. This ensures that the comparison process will determine that the blocks mismatch, such that they will (all) be written to the output buffer (e.g. window or frame buffer). As discussed above, this then means that the processing and/or bandwidth requirements for performing the transaction elimination operation can be reduced for frames where it can be determined that it is unlikely to be of benefit.

Other arrangements would of course be possible. For example, for frames where the number of static blocks is below the threshold, more or less of the transaction elimination process may be omitted or disabled. For example, in some embodiments, the comparison process may be omitted or disabled.

The determination need not be carried out for every frame, and could instead be carried out for every few, e.g. every second, third, etc., frame. The results of the determination could then be "carried over" to the successive frames.

It would also be possible to carry out the threshold determination for less than all of the frame, e.g. for one or more portions of the frame. For example, if it is already known that certain portions of each frame are likely to always be varying or to always be static, then the determination could be omitted for those portions of the frame (and those portions could never or always be subjected to a transaction elimination operation). The threshold determination may be carried out only for the other portions (e.g. those portions of each frame that may change between being varying and static), so as to selectively enable and disable the transaction elimination operation only for those portions of the frame.

In one embodiment, the number of blocks of data within the frame that have not changed relative to the previous frame is counted by evaluating information provided to the video processor 3 that indicates which blocks of data have changed from the previous frame. Such information may, for example, be in the form of a "change map", e.g. in the form of a bitmap (an array of bits) with each bit representing a respective block in the frame, where each bit is set to indicate whether the block that it represents has changed or not. Such information may already exist, or may already have been calculated, e.g. as part of an operation that the video processing system already carries out.

Although the above embodiments have been described in terms of the video processor 3 decoding video data, the techniques of the technology described herein may also be applied to video encoding techniques. For example, the output frame may be a reference frame output by the video processor 3 during an encoding operation, and the transaction elimination operation may be selectively enabled/disabled for the reference frame output depending on the number of blocks of data within the reference frame that have changed relative to the previous reference frame.

The transaction elimination operation of the present embodiment that is carried out for frames that have a number of static blocks exceeding the threshold, will now be described with reference to FIGS. 3-6.

Figure 3:
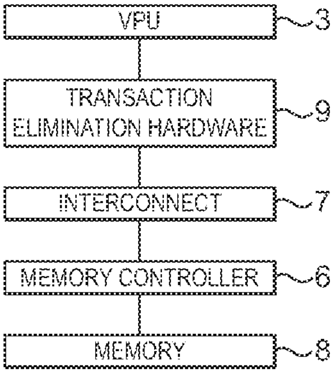
FIG. 3 shows schematically an embodiment of the technology described herein.

As shown in FIG. 3, transaction elimination may be implemented using a transaction elimination hardware unit 9, which controls the writing of pixel blocks generated by the video processor 3 to the output buffer in the memory 8. In essence, the transaction elimination hardware operates to generate for each relevant pixel block a signature representative of the content of the pixel block and then compares that signature with the signature of one or more pixel blocks already stored in the output buffer to see if the signatures match.

If the signatures match, it is then assumed that the new pixel block is the same as the pixel block already stored in the output buffer, and so the transaction elimination hardware unit 9 abstains from writing the new pixel block to the output buffer.

In this way, write traffic for sections of the output buffer that don't actually change from one frame to the next can be avoided. This can save a significant amount of bandwidth and power consumption in relation to the output buffer operation.

On the other hand, if the signatures do not match, then the new pixel block is written to the output buffer and the generated signature for the pixel block is also written to memory 8.

Figure 4:
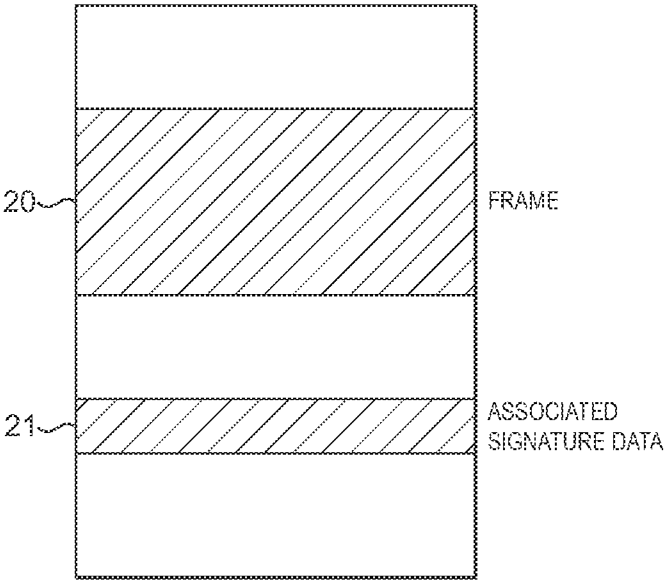
FIG. 4 shows schematically how the relevant data is stored in memory in an embodiment of the technology described herein.

FIG. 4 shows an exemplary memory layout for this, in which the pixel blocks making up the frame are stored in one portion 20 of the memory (thus forming the "output buffer") and the associated signatures for the pixel blocks making up the frame are stored in another portion 21 of the memory. (Other arrangements would, of course, be possible.)

(Where the output buffer is double buffered, then in an embodiment signature data is stored for (and with) each frame. A new pixel block would then be compared with the oldest frame in memory.)

Figure 5:
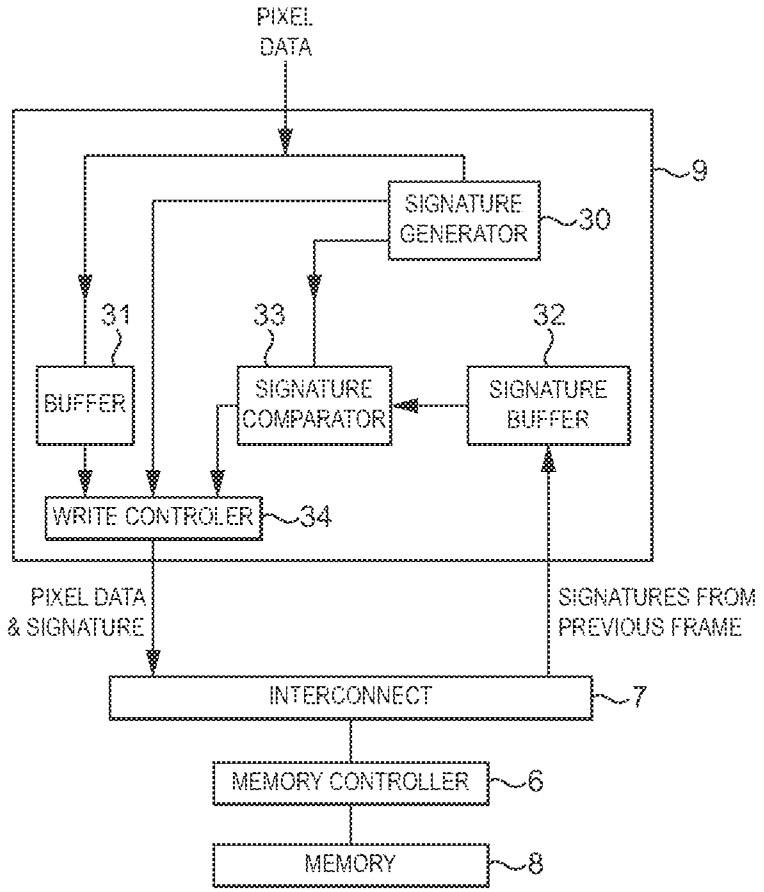
FIG. 5 shows schematically and in more detail the transaction elimination hardware unit of the embodiment shown in FIG. 3.

FIG. 5 shows the transaction elimination hardware unit 9 in more detail.

As shown in FIG. 5, the pixel block data received by the transaction elimination hardware unit 9 from the video processor 3 is passed both to a buffer 31 which temporarily stores the pixel block data while the signature generation and comparison process takes place, and a signature generator 30.

The signature generator 30 operates to generate the necessary signature for the pixel block. In the present embodiment the signature is in the form of a 32 bit CRC for the pixel block.

Other signature generation functions and other forms of signature such as hash functions, etc., could also or instead be used, if desired. It would also, for example, be possible to generate a single signature for an RGBA pixel block, or a separate signature for each colour plane. Similarly, colour conversion could be performed and a separate signature generated for each of Y, U and V. In order to reduce power consumption, the pixel block data processed in by the signature generator 30 could be reordered (e.g. using the Hilbert curve), if desired.

Once the signature for the new pixel block has been generated, it is passed to a signature comparator 33, which operates to compare the signature of the new pixel block with the signature or signatures of a pixel block or pixel blocks that is or are already present in the output buffer. In the present embodiment, the comparison is with the signature of the pixel block already in the output buffer at the pixel block position for the pixel block in question.

The signatures for plural pixel blocks from the previous frame are cached in a signature buffer 32 (this buffer may be implemented in a number of ways, e.g. buffer or cache) of the transaction elimination hardware unit 9 to facilitate their retrieval in operation of the system, and so the signature comparator 33 fetches the relevant signature from the signature buffer 32 if it is present there (or triggers a fetch of the signature from the main memory 8, as is known in the art), and compares the signature of the previous frame's pixel block with the signature received from the signature generator to see if there is a match.

If the signatures do not match, then the signature comparator 33 controls a write controller 34 to write the new pixel block and its signature to the output buffer and associated signature data store in the memory 8. On the other hand, if the signature comparator finds that the signature of the new pixel block matches the signature of the pixel block already stored in the output buffer, then the write controller 34 invalidates the pixel block and no data is written to the output buffer (i.e. the existing pixel block is allowed to remain in the output buffer and its signature is retained).

In this way, a pixel block is only written to the output buffer in the memory 8 if it is found that by the signature comparison to differ from a pixel block that is already stored in the memory 8. This helps to reduce the number of write transactions to the memory 8 as a frame is being generated.

In the present embodiment, to stop incorrectly matched pixel blocks from existing for too long a long period of time in the output buffer, the signature comparison for each stored pixel block in the output buffer is periodically disabled (in an embodiment once a second). This then means that when a pixel block whose signature comparison has been disabled is newly generated, the newly generated pixel block will inevitably be written to the output buffer in the memory 8. In this way, it can be ensured that mismatched pixel blocks will over time always be replaced with completely new (and therefore correct) pixel blocks.

In the present embodiment, the stored pixel blocks' signature comparisons are disabled in a predetermined, cyclic, sequence, so that each second (and/or over a set of say, 25 or 30 frames), each individual pixel block will have its signature comparison disabled (and hence a new pixel block written for it) at least once.

Other arrangements would be possible. For example, the system could simply be arranged to write out a completely new frame periodically (e.g. once a second). Additionally or alternatively, longer signatures could be used for each pixel block, as that should then reduce significantly the rate at which any false pixel block matches due to identical signatures for in fact different pixel blocks occur.

(Alternatively, as any such false pixel block matches are unlikely to be perceptible due to the fact that the pixel blocks will in any event still be similar and the mismatched pixel block is only likely to be displayed for the order of 1/30th of a second or less, it may be decided that no precautions in this regard are necessary.)

It would also be possible to, for example, weight the signature generation to those aspects of a pixel block's content that are considered to be more important (e.g. in terms of how the user perceives the final displayed pixel block). For example, a longer signature could be generated for the MSB bits of a colour as compared to the LSB bits of a colour (as in general the LSB bits of a colour are less important than the MSB bits). The length of the signature could also be adapted in use, e.g., depending upon the application, to help minimise power consumption.

In an embodiment, the data block signatures that are generated for use in the technology described herein are "salted" (i.e. have another number (a salt value) added to the generated signature value) when they are created. The salt value may conveniently be, e.g., the output frame number since boot, or a random value. This will, as is known in the art, help to make any error caused by any inaccuracies in the comparison process of the technology described herein non deterministic (i.e. avoid, for example, the error always occurring at the same point for repeated viewings of a given video sequence).

As discussed above, in the present embodiment, the signature comparison process operates to compare a newly generated pixel block with the pixel block that is stored for the corresponding pixel block position in the output buffer.

However, in another embodiment, a given generated pixel block is compared with multiple pixel blocks already stored in the output buffer. In this case, the signature generated for the pixel block will accordingly be compared with the signatures of plural pixel blocks stored in the output buffer. It may be in this case that such comparisons take place with the signatures of the pixel blocks that are stored in the signature buffer 32 of the transaction elimination hardware unit 9 (i.e. with a subset of all the stored pixel blocks for the frame), although other arrangements, such as comparing a new pixel block with all the stored pixel blocks would be possible if desired. In an embodiment the pixel blocks are processed in an appropriate order, such as a Hilbert order, in order to increase the likelihood of matches with the pixel blocks whose signatures are stored in the signature buffer 32.

In this case, the signature generated for a new pixel block will accordingly be compared with the signatures of multiple pixel blocks in the current output frame (which pixel blocks may, as will be appreciated by those skilled in the art, be pixel blocks that have been newly written to the current frame, or pixel blocks from previous frame(s) that have, in effect, been "carried forward" to the present frame because they matched a pixel block of the present frame).

In this embodiment a list that indicates whether a pixel block is the same as another pixel block having a different pixel block coordinate in the previous frame or not is maintained. Then, on reading a pixel block to be displayed, the corresponding list entry is read. If the list entry value is null, the data stored in the normal pixel block position for that pixel block is read. Otherwise, the list entry will contain the address of a different pixel block to read, which may, e.g., be automatically translated by the transaction elimination hardware unit 5 to determine the position of the pixel block in the output buffer that should be read for the current pixel block position.

In one embodiment, the pixel block comparison process is carried out for each and every pixel block of frames determined to have the particular property. However, in another embodiment, an adaptive scheme is used where fewer pixel blocks are analysed when there is expected or determined to be little correlation between frames. In this arrangement, the historic number of pixel block matches may used as a measure of the correlation between the frames (since if there are a lot of pixel block matches, there can be assumed to be a lot of correlation between frames, and vice versa). In an embodiment the syntax elements that encode the frame can be used here.

Thus, in this case, when it is determined that there is a lot of correlation between the frames, then signatures are generated and comparisons carried out for all of the pixel blocks, whereas when it is determined that there is little correlation between frames, then signatures are generated and the pixel block comparison process performed for fewer pixel blocks.

Figure 6A:
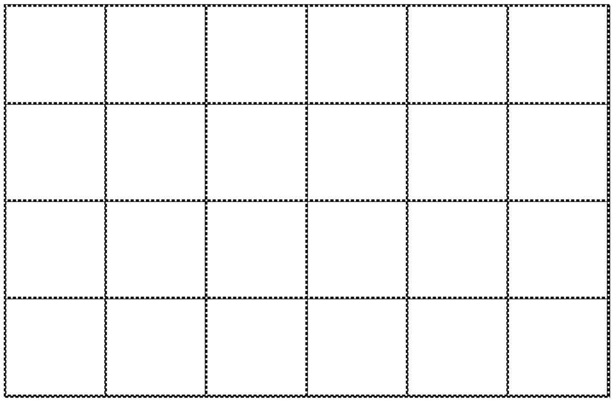
FIGS. 6*a* and 6*b* show schematically possible modifications to the operation of an embodiment of the technology described herein.
Figure 6B:
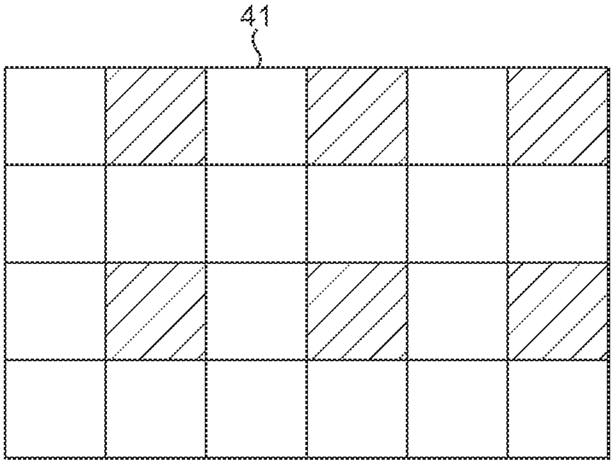

FIG. 6 illustrates this. FIG. 6*a* shows the case where there is a lot of correlation between frames and so signatures are generated for all pixel blocks. FIG. 6*b* shows the converse situation where there is little correlation between frames, and so in this case signatures are generated and compared for only a subset 41 of the pixel block.

It would also be possible to use these principles to, for example, try to determine which particular portions of the frame have a higher correlation, and then increase the number of pixel blocks that are subject to the comparison in particular regions of the frame only, if desired.

The present arrangement also can be used in conjunction with other output buffer power and bandwidth reduction techniques, such as frame buffer compression. In this case, the write transaction elimination is in an embodiment performed first, before the compression (or other) operation is carried out. Then, if the comparison process finds that the pixel blocks' signatures are the same, the previous compressed pixel block can then be retained as the pixel block to use in the current output frame, but if the pixel block is not "eliminated", then the new pixel block will be sent to the frame buffer compression (or other) hardware and then on to the output buffer in memory. This then means that if the pixel blocks' signatures match, the compression operation can be avoided.

Although the present embodiment has been described above with particular reference to the comparison of pixel blocks to be written to the output buffer, as discussed herein, it is not necessary that the data blocks forming regions of the output frame that are compared (and e.g. have signatures generated for them) correspond exactly to pixel blocks generated by the video processor.

For example, the data blocks that are considered and compared could be made up of plural pixel blocks and/or could comprise sub portions of pixel block. Indeed, different data block sizes may be used for different regions of the same output frame and/or the data block size and shape could be adaptively changed, e.g. depending upon the write transaction elimination rate, if desired.

Where a data block size that does not correspond exactly to the size of a pixel block is being used, then the transaction elimination hardware unit 9 may conveniently be configured to, in effect, assemble or generate the appropriate data blocks (and, e.g., signatures for those data blocks) from the data, such as the pixel block, that it receives from the video processor.

It can be seen from the above that the technology described herein, in its embodiments at least, can help to reduce, for example, video processor power consumption and memory bandwidth.

This is achieved, in the embodiments of the technology described herein at least, by selectively enabling and disabling a transaction elimination operation in which unnecessary output buffer memory transactions are eliminated, based on a property of the video frames. This reduces the amount of processing and data that is written to the output buffer, thereby significantly reducing system power consumption and the amount of memory bandwidth consumed.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a video processor comprising:

when a new frame of video data is to be stored in an output buffer, determining for at least a portion of the new frame of video data whether the portion of the new frame of video data includes a threshold number of static blocks of data that represent the portion of the new frame of video data and that are unchanged relative to a previous frame of video data by evaluating one or more video encoding syntax elements of encoded blocks of video data that represent the portion of the new frame of video data;

wherein when it is determined that the portion of the new frame of video data includes the threshold number of static blocks of data that represent the portion of the new frame and that are unchanged relative to a previous frame of video data, then the method further comprises: when a block of data representing a particular region of the portion of the new frame of video data is to be written to the output buffer, comparing that block of data to at least one block of data already stored in the output buffer, and determining whether or not to write the block of data to the output buffer on the basis of the comparison;

wherein when it is determined that the portion of the new frame of video data includes less than the threshold number of static blocks of data that represent the portion of the new frame and that are unchanged relative to a previous frame of video data, then the method further comprises: writing the portion of the new frame of video data to the output buffer, wherein when a block of data representing a particular region of the portion of the new frame of video data is to be written to the output buffer, the block of data is written to the output buffer without comparing the block of data to another block of data.

2. A method as claimed in claim 1, comprising determining whether the portion of the new frame includes the threshold number of static blocks of data that represent the portion of the new frame and that are unchanged relative to a previous frame by evaluating an encoded video data stream that represents the portion of the new frame.

3. A method as claimed in claim 2, wherein the one or more syntax elements are encoded in the encoded video data stream and indicate that an encoded block of data has not changed relative to a corresponding block of data in a previous frame.

4. A method as claimed in claim 1, wherein:

when it is determined that the portion of the new frame of video data includes the threshold number of static blocks of data that represent the portion of the new frame of video data and that are unchanged relative to a previous frame of video data, then the method further comprises: when the block of data representing the particular region of the portion of the new frame of video data is to be written to the output buffer, calculating a signature representative of the content of the block of data and comparing the signature to a signature representative of the block of data already stored in the output buffer;

when it is determined that the portion of the new frame of video data includes less than the threshold number of static blocks of data that represent the portion of the new frame of video data and that are unchanged relative to a previous frame of video data, then the method further comprises: when a block of data representing a particular region of the portion of the new frame of video data is to be written to the output buffer, writing the block of data to the output buffer without calculating a signature representative of the content of the block of data.

5. The method of claim 1 wherein the determining the number of threshold blocks is performed by counting the number of the syntax elements in the encoded video data stream that represents the portion of the new frame of video data.

6. A video processing system comprising:

video decoding circuitry;

an output buffer; and processing circuitry configured to:

(i) when a new frame of video data is to be stored in the output buffer, determine for at least a portion of the new frame of video data whether the portion of the new frame of video data includes a threshold number of static blocks of data that represent the portion of the new frame of video data and that are unchanged relative to a previous frame of video data by evaluating one or more video encoding syntax elements of encoded blocks of video data that represent the portion of the new frame of video data;

(ii) when it is determined that the portion of the new frame of video data includes the threshold number of static blocks of data that represent the portion of the new frame of video data and that are unchanged relative to a previous frame of video data: when a block of data representing a particular region of the portion of the new frame of video data is to be written to the output buffer, compare that block of data to at least one block of data already stored in the output buffer, and determine whether or not to write the block of data to the output buffer on the basis of the comparison; and (iii) when it is determined that the portion of the new frame of video data includes less than the threshold number of static blocks of data that represent the portion of the new frame of video data and that are unchanged relative to a previous frame of video data: write the portion of the new frame of video data to the output buffer, wherein when a block of data representing a particular region of the portion of the new frame of video data is to be written to the output buffer, the block of data is written to the output buffer without comparing the block of data to another block of data.

7. A video processing system as claimed in claim 6, wherein the processing circuitry is configured to determine whether the portion of the new frame includes the threshold number of static blocks of data that represent the portion of the new frame and that are unchanged relative to a previous frame by evaluating an encoded video data stream that represents the portion of the new frame.

8. A video processing system as claimed in claim 7, wherein the one or more syntax elements are encoded in the encoded video data stream and indicate that an encoded block of data has not changed relative to a corresponding block of data in a previous frame.

9. A video processing system as claimed in claim 6, wherein the processing circuitry is configured to:

when it is determined that the portion of the new frame of video data includes the threshold number of static blocks of data that represent the portion of the new frame of video data and that are unchanged relative to a previous frame of video data: when the block of data representing the particular region of the portion of the new frame of video data is to be written to the output buffer, calculate a signature representative of the content of the block of data and to compare the signature to a signature representative of the block of data already stored in the output buffer;

when it is determined that the portion of the new frame of video data includes less than the threshold number of static blocks of data that represent the portion of the new frame of video data and that are unchanged relative to a previous frame of video data: when a block of data representing a particular region of the portion of the new frame of video data is to be written to the output buffer, write the block of data to the output buffer without calculating a signature representative of the content of the block of data.

10. The system of claim 6 wherein the processing circuitry configured to:

determine for at least a portion of the new frame whether the portion of the new frame includes the threshold number of static blocks of data that represent the portion of the new frame and that are unchanged relative to a previous frame by counting the number of the syntax elements in the encoded video data stream that represents the portion of the new frame of video data.

11. A non-transitory computer readable storage medium storing computer software code which when executing on a processor performs a method of operating a video processor comprising:

when a new frame of video data is to be stored in an output buffer, determining for at least a portion of the new frame of video data whether the portion of the new frame of video data includes a threshold number of static blocks of data that represent the portion of the new frame of video data and that are unchanged relative to a previous frame of video data by evaluating one or more video encoding syntax elements of encoded blocks of video data that represent the portion of the new frame of video data;

wherein when it is determined that the portion of the new frame of video data includes the threshold number of static blocks of data that represent the portion of the new frame of video data and that are unchanged relative to a previous frame of video data, then the method further comprises: when a block of data representing a particular region of the portion of the new frame of video data is to be written to the output buffer, comparing that block of data to at least one block of data already stored in the output buffer, and determining whether or not to write the block of data to the output buffer on the basis of the comparison;

wherein when it is determined that the portion of the new frame of video data includes less than the threshold number of static blocks of data that represent the portion of the new frame of video data and that are unchanged relative to a previous frame, then the method further comprises: writing the portion of the new frame of video data to the output buffer, wherein when a block of data representing a particular region of the portion of the new frame of video data is to be written to the output buffer, the block of data is written to the output buffer without comparing the block of data to another block of data.

12. The computer readable storage medium of claim 11 wherein determining the number of threshold blocks is performed by counting the number of the syntax elements in the encoded video data stream that represents the portion of in the new frame of video data.

* * * * *